United States Patent [19]

Grant

[11] Patent Number: 4,823,227

[45] Date of Patent: Apr. 18, 1989

[54] THREE-PHASE MONITOR CIRCUITRY

[75] Inventor: James E. Grant, Orlando, Fla.

[73] Assignee: Sta-Con, Inc., Apopka, Fla.

[21] Appl. No.: 111,130

[22] Filed: Oct. 21, 1987

Related U.S. Application Data

[63] Continuation of Ser. No. 776,509, Sep. 16, 1985, abandoned.

[51] Int. Cl.[4] .............................................. H02H 3/20
[52] U.S. Cl. ...................................... 361/90; 307/358; 307/360
[58] Field of Search ............................ 361/47, 88, 90; 307/358, 360; 324/86; 363/129; 323/231, 300

[56] References Cited

U.S. PATENT DOCUMENTS

| 3,230,440 | 1/1966 | Kleiner | 361/90 |
| 4,333,050 | 6/1982 | Yeasting | 361/90 |
| 4,333,119 | 6/1982 | Schoenmeyr | 361/90 |
| 4,449,080 | 5/1984 | Konract et al. | 361/90 |
| 4,507,713 | 3/1985 | Hsieh | 361/90 |

FOREIGN PATENT DOCUMENTS

| 3042540 | 6/1982 | Fed. Rep. of Germany | 361/90 |
| 0116277 | 9/1979 | Japan | 361/90 |

Primary Examiner—A. D. Pellinen
Assistant Examiner—Jeffrey A. Gaffin
Attorney, Agent, or Firm—Edward M. Livingston

[57] ABSTRACT

Solid state circuitry designed to protect three phase electrical equipment operating from two hundred forty (240) to four hundred eighty (480) volt power from loss of any phase, phase reversal, or under voltage or over voltage of the power supply. The circuitry is designed so that if phasing and voltage are correct, then the device will energize an output relay thus enabling the load to operate the protected equipment. This circuitry accomplishes all of the above with much lower power dissipation than other monitoring devices.

6 Claims, 2 Drawing Sheets

THREE-PHASE MONITOR CIRCUITRY

This application is a continuation of application Ser. No. 776,509, filed Sept. 16, 1985, which is now abandoned.

BACKGROUND OF THE INVENTION

This invention relates to phase monitor devices designed to protect electrical equipment powered by three phase voltage changes in phase and voltage.

The prior art contains numerous phase monitoring devices. Unfortnately, these prior phase monitors are very limited in the forms of protection they provide. For example, many prior phase monitors do not provide for over voltage protection or for hysteresis, sometimes called "dead band" of the setpoints. Also, prior phase monitors are very inefficient and require highere power to operate them, thereby increasing the operating temperatures of the device which results in a decrease in the life of the instrument.

On the other hand, the instant phase monitor circuitry provides for lower power dissipation which extends the operating temperature range and life of the instrument. Also the addition of hysteresis further protects the controlled load by preventing the load from being cycled "on" and "off" by slightly varying voltages at the lower or upper limits. The instant circuitry is designed so that after the voltage has exceeded the lower or upper limit which disables the load, the voltage must return to approximately three percent (3%) within operational limits before the load is enabled again to run the protected equipment.

The instant design also incorporates an over voltage setpoint not found in many prior circuits. The setpoits are normally set at plus or minus ten percent (10%) of the voltage set on the devices adjustment control.

A further feature of the instant invention not found in prior circuitry is a switching-type power supply to drive the output relay coil which decreases power dissipation, contrary to circuits of prior existing phase monitor devices which power the output relay from rectified line voltage.

The instant circuitry also has another low dissipation power supply which powers the circuitry. This low voltage supply uses capacitive reactance which does not dissipate power rather than resistance like prior art circuitry, to derive the supply voltage for the electronics.

SUMMARY OF THE INVENTION

The primary object of the instant invention is to provide substantial improvement over existing phase monitors by expanding the scope of protection provided to equipment with which it is used.

Another object is to provide lower power dissipation through the phase monitor circuitry thereby saving electrical power.

An even further object of the invention is to extend the life of the instrument employing the phase monitor circuitry of the instant invention.

The instant invention accomplishes the above objects by the addition of over-voltage protection and hysteresis for voltage setpoints.

The instant circuitry provides for a lower power dissipation by utilizing capacitive reactance rather than resistors in its low voltage power supply. This results in lower internal temperatures of the phase monitor instrument which in turn allows it to operate at a higher ambient temperatures and extends instrument life.

DESCRIPTION OF THE PREFERRED EMBODIMENT

Figure 1:
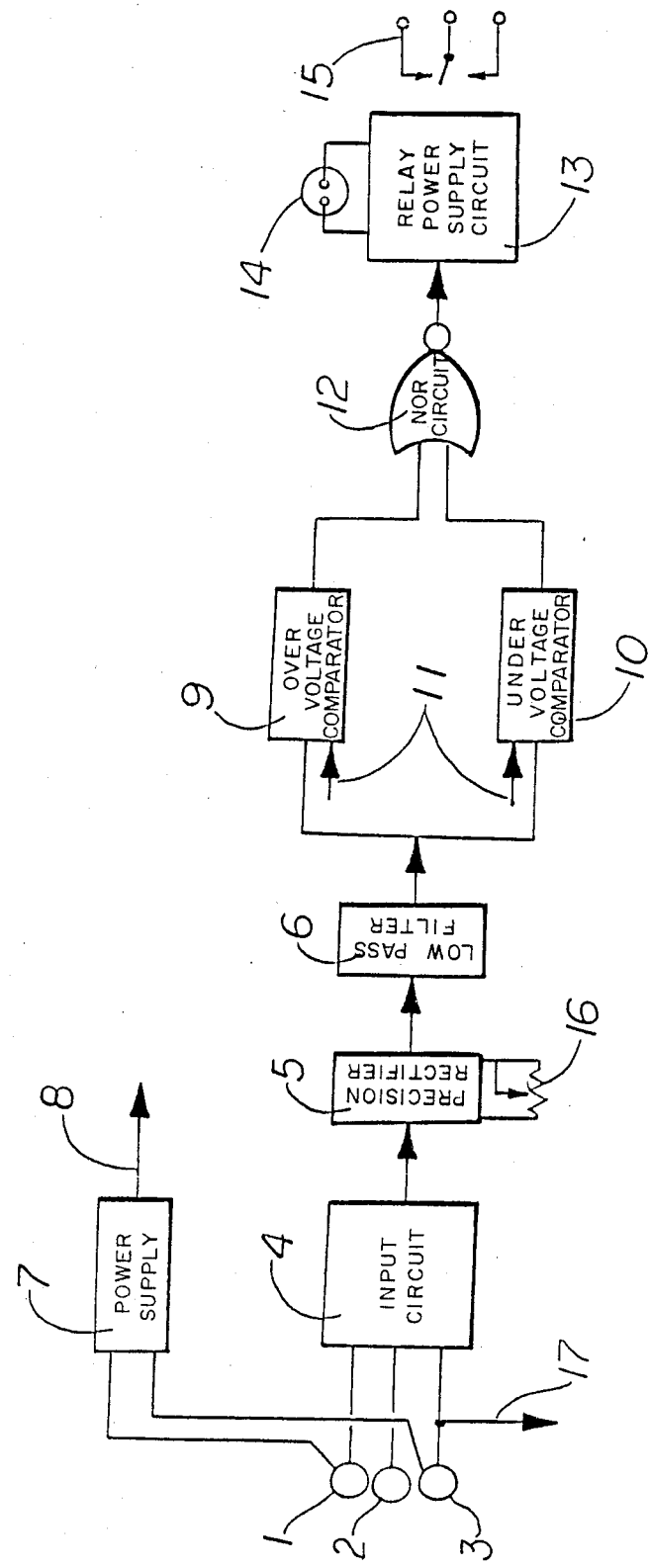
FIG. 1 is a block diagram of the major components of the phase monitor circuitry.
Figure 2:
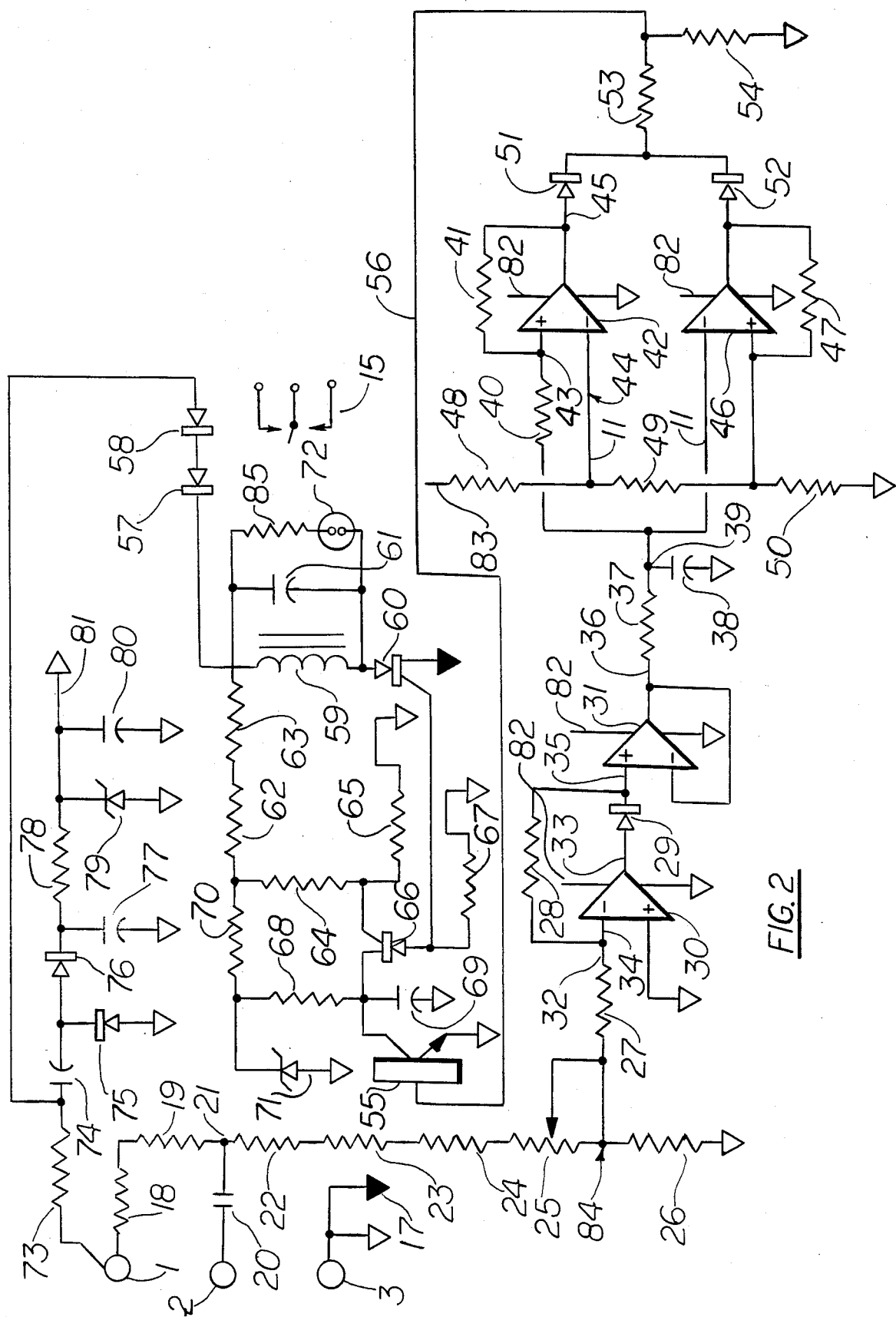
FIG. 2 is a detailed schematic showing the electrical circuitry of the device.

Referring now to the drawings, FIG. 1 shows the major circuits comprising the invention, while FIG. 2 shows the components of each of those circuits. The invention will be described by first referring to each of the major circuits shown in the block diagram and then describing the detailed components of that section by reference to FIG. 2.

First, the input circuit consists of one watt resistors 18 and 19, and capacitor 20 in series from Phase "A" at 1, to Phase "B" at 2. The AC voltage at the Phase "C" 3, or "circuit common 17," is proportional to the incoming three phase AC voltage. The voltage at this junction 21 will also drop substantially below the lower setpoint limit if any phase is lost or reversed.

The output of the input circuit 4 is then applied to the next major part of the circuitry, the electronic precision rectifier 5. The circuitry within the precision rectifier 5 consists of fixed resistors 22, 23, 24, 26, 27, 28, together with diode 29 and differential imput operational amplifiers 30 and 31. All the fixed resistors in this part of the circuitry are ±1% metal film resistors. The variable resistor 25 which acts as a potentiometer uses a cermet resistance element. Some resistors in other circuits are one quarter watt, five percent (5%) carbon film resistors. Resistors 22, 23, 24, 25 and 26 form a voltage divider which divides the high voltage input to approximately eight (8) volts peak to peak at node 84. This voltage is then applied to resistor 27. During positive-going half cycles the positive-going input voltage 32 is applied to the inverting input 34 of the operational amplifier 30 which drives its output 33 negative, thus disconnecting the diode 29. The positive going input voltage 32 also passes through resistor 28 to the non-inverting input 35 of the operational amplifier 31 which is connected as gain of 1. During negative half cycles, the output 33 of the operational amplifier 30 swings positive, thereby forward biased diode 29 and providing negative feedback through resistor 28 to the inverting input 34 of the operational amplifier 30. The ratio of resistors 27 and 28 determine the gain of the precision rectifier circuit 5 which is approximately digital 1. This positive going signal from the amplifier 30 which is not inverting, is applied to amplifier 31 just as during the positive going input cycles. Thus, for either positive or negative input cycles at its input, the output 36 of the precision rectifier 5 is proportional to the absolute value of the input voltage 21.

The rectified direct current ("DC") output voltage 36 of the precision rectifier 5 which is unfiltered and proportional to the three phase input voltage, is fed to the low pass filter 6. This filter 6 consists of a resistor 37 and a capacitor 38. The time constant of this "single-pole" filter 6 is several times longer than the period of the input signal 36, so that the filter's output 39 is a smooth DC voltage.

The output 39 of low pass filter 6 is then applied to both an overvoltage comparator 9 and under voltage comparator 10 as shown in FIG. 1. The circuitry of the over voltage comparator 9 consists of resistors 40 and 41 and amplifier 42. Resistors 40 and 41 from a voltage divider which normally lowers the input voltage to the noninverting input 43 to amplifier 42. Then amplifier 42 compares its non-inverting input 43 to a reference voltage at 44 derived from the low voltage power supply and reference 7 shown in FIG. 1 via line 83 in FIG. 2. Normally the output 45 of amplifier 42 is near zero voltage, thus lowering the non-inverting input signal 43 of the amplifier 42. When the input signal 39 raises the non-inverting input 43 of the amplifier 42 above the inverting input 44, the output 45 of the amplifier 42 swings positive, thus further raising or reinforcing the input 43 through resistor 41. This positive feedback causes the output 45 of the amplifier 42 to be digital or bi-stable and provides hysteresis proportional to the voltage divider ratio of resistors 40 and 41.

The undervoltage comparator 10 consists of amplifier 46 along with resistors 47, 48, 49 and 50. Inasmuch as the operation of the undervoltage comparator 10 is substantially identical to that of the over voltage comparator 9 described above, the operation of the under voltage comparator does not need to be described.

The digital output of either comparators 9 or 10 may de-energize the output relay 15 through the logical NOR circuit 12. The logical NOR circuit 12 consists of diodes 51 and 52, resistors 53 and 54 and transistor 55. A digital "1" from either comparator 9 or 10 forward biases diode 51 or diode 52. Current then flows through resistor 53 to the base emitter junction 56 of the NPN transistor 55 thus turning it "on". When transistor 55 turns "on" it disables the switching relay power supply 13, thus deenergizing the output coil 59.

The switching relay power supply 13 powers the output relay contacts 15 and consists of diodes 57, 58 and zener diode 71, relay coil 59, silicon controlled rectifier ("SCR") 60 and programmable unijunction transistor 66, capacitors 61 and 69, resistors 62, 63, 64, 65, 67, 68 and 70. Although, this circuit 13 contains many components it drives the output relay coil 59 while dissipating very little power. The lower power dissipation is achieved by switching the power line voltage to the relay coil 59 and energy storage capacitor 61 at the precise time when the line voltage is passing through the voltage of the relay coil 59. At the beginning of each positive going half cycle the voltage at zener diode 71 rises from zero to approximately 12 volts DC, which begins charging capacitor 69 through resistor 68. When the voltage across capacitor 69 equals the reference voltage at the junction of resistors 64 and 65, the programmable unijunction transistor 66 fires, thereby dumping the charge in capacitor 69 into the gate to cathode junction of SCR 60. When SCR 60 is fired the instantaneous line voltage is applied across the relay coil 59 and capacitor 61. Capacitor 61 holds enough charge to keep the relay coil 59 energized until the next positive going half cycle when capacitor 61 is recharged. The inclusion of resistor 70 compensates the voltage of the relay power supply circuit 13 by adjusting the intrinsic standoff ratio of the programmable unijunction transistor 66 with line voltage. This voltage compensation allows the relay coil 59 to be driven with an essentially constant voltage even though the line voltage may vary substantially. An neon indicator light 72 in series with resistor 85 indicates when the relay coil 59 is energized and the load is operating.

The next major component of the device is a low voltage power supply 7 which provides both operating power for the circuitry and a stable reference voltage for comparators 9 and 10. The low voltage power supply 7 consist of resistors 73 and 78, capacitors 74, 77 and 80 and diodes 75, 76. The voltage reference 79 is a landgap reference. As with the entire device, this power supply 7 is designed to dissipate very little power. The low dissipation is achieved by using the capacitive reactance instead of resistance to charge capacitor 77. During the negative going half cycle of line, capacitor 74 is charged through resistor 73 and diode 75. On the other hand during positivegoing half cycles the charge is transferred to capacitor 77 through diode 76. Current flows from capacitor 77 through resistor 78 to forward bias a band gap voltage reference diode 79 which shunt regulates the power supply output 81 to 6.9 volts DC plus or minus five percent (5%). This power is supplied to the other circuits throughout the device, such as precision rectifier circuit 5 by input line 82, and as a reference for the comparators 9 and 10 via input line 83.

In summary, the instant circuitry of the instant invention provides a substantial improvement over many prior phase monitor circuits by adding overvoltage protection and hysteresis. In addition, the instant design provides lower power dissipation, wider working temperature range and a longer life for instruments employing this circuitry.

While one specific embodiment of the invention has been described in detail above it is to be understood that various modifications may be made from the specific details described hereinabove without departing from the spirit and scope of the invention as described herein and in the claims appended hereto.

I claim the following:

1. A three-phase monitoring device monitoring phase sequence and voltage amlpitude to protect equipment using three-phase AC voltage, which comprises:
   an input circuit means comprising three input lines, phase A, phase B and phase C, in which a voltage of phase A passes through two resistor to join together with a voltage of phase B as the voltage of phase B passes through a capacitor, said capacitor having a certain value to result in the voltage of phase B being shifted to be in phase with the voltage of phase A, a voltage of phase C being the ground potential to which the summation of the voltages of phases A and B are referenced, said summation of the voltages being further divided lower in amplitude prior to being rectified and being proportional to the three-phase AC voltage;
   a means of converting the three-phase AC voltage to rectified direct current (DC) voltage;
   a means for filtering the rectified DC voltage to yield a filtered receified DC voltage;
   a means for comparing the filtered rectified DC voltage to two DC reference voltages;
   a means for disconnecting the three-phase AC voltage from the equipment using the three-phase voltage if the filtered rectified DC voltage is not within predetermined limits set by the two DC reference voltages and an output circuit that uses the voltage of phase A to energize an output load relay in a switching manner that requires low power dissipation; and a means for supplying a low dissipation power source using the voltage of phase A, the output of said source from which is a voltage potential used to operate the monitoring circuitry, as well as providing a stable reference voltage.

2. The three-phase monitoring device set forth in claim 1 wherein said means for converting the three-phase AC voltage to rectified DC voltage consists of a circuit having two resistors, one diode, and two operational amplifiers all combined to form a precision rectifier circuit, the input voltage to which is a proportional AC voltage from the input circuit means and the output voltage being a half-wave rectified DC voltage.

3. The three-phase monitoring device set forth in claim 1 wherein said means for filtering the rectified DC voltage consists of using a low pass filter having a resistor and a capacitor, the input voltage to which is the rectified DC voltage and the output voltage of the filter being a smooth DC voltage to be the input voltage to the means for comparing.

4. The three-phase monitoring device set forth in claim 1 wherein said means for comparing the filtered rectified DC voltage to two DC reference voltages consists of a logical nor circuit further comprised of:

an overvoltage comparator, the inputs to which are the filtered rectified DC voltage and the DC reference voltage having the larger amplitude, which are compared to yield a digital output, said digital output being high if the filtered rectified DC voltage exceeds said DC reference voltages having the larger amplitude by a pre-selected limit and the digital output being low if the three-phase AC voltage is within phase and amplitude tolerances; and an undervoltage comparator, the inputs to which are the filtered rectified DC voltage and the DC reference voltage having the lesser amplitude, which are compared to yield a digital output being high if the filtered rectified DC voltage is less than said DC reference voltage having the lesser amplitude by a pre-selected limit and the digital output being low of the three-phase AC voltage is within phase and amplitude tolerances, the outputs of the two comparators being isolated from each other by diodes connected to the base of a transistor.

5. The three-phase monitoring device set forth in claim 1 wherein said means for disconnecting the three-phase AC voltage from the equipment using the three-phase AC voltage is the filtered rectified DC voltage is not within pre-determined limits set by the DC reference voltages comprises de-energizing an output load relay by grounding the anode of the low power switching circuit.

6. The three-phase monitoring device set forth in claim 1 wherein said means for supplying a low dissipation power source comprises referencing the voltage of phase A of the three-phase AC voltage to the voltage of phase C, the voltage amplitude being rectified and clamped to the device's voltage potential by the use of a zener diode, said voltage potential supplying the device's monitoring circuitry as well as the input voltage to the voltage divider circuit from which the two referenced voltages are developed.

* * * * *